United States Patent [19]

Cage et al.

[11] Patent Number: 5,225,805
[45] Date of Patent: Jul. 6, 1993

[54] WARNING INDICATOR FOR ANTI-SKID BRAKING SYSTEM

[75] Inventors: Jerry L. Cage, Granger; Brian S. Olmstead, South Bend, both of Ind.

[73] Assignee: Allied Signal Inc., Morristown, N.J.

[21] Appl. No.: 795,551

[22] Filed: Nov. 21, 1991

[51] Int. Cl.$^5$ ............................................. B60Q 1/00
[52] U.S. Cl. ................................... 340/439; 340/438; 340/453; 340/507; 303/92
[58] Field of Search ............... 340/453, 438, 439, 507; 303/92, 93; 439/34-36, 92, 101; 188/1-11

[56] References Cited

U.S. PATENT DOCUMENTS

| | | | |
|---|---|---|---|
| 3,759,582 | 9/1973 | Ohta et al. | |
| 3,852,613 | 12/1974 | Wienecke | 307/10 |
| 3,874,743 | 4/1975 | Fleischer et al. | 303/21 |
| 3,891,279 | 6/1975 | Frait | 303/21 |
| 3,911,392 | 10/1975 | Fleagle | |
| 3,964,017 | 6/1976 | Arai et al. | 340/52 |
| 4,040,676 | 8/1977 | Rajput | 340/453 |
| 4,082,370 | 4/1978 | Leiber et al. | 303/92 |
| 4,098,542 | 7/1978 | Rajput et al. | 303/92 |
| 4,109,234 | 8/1978 | Davis | 340/453 |
| 4,709,223 | 11/1987 | Crapanzano | 340/52 |
| 4,802,710 | 2/1989 | Burgdorf et al. | 303/11 |
| 4,841,446 | 6/1989 | Leiber et al. | 364/426 |
| 4,884,056 | 11/1989 | Ishizeki | 340/453 |

Primary Examiner—Donnie L. Crosland
Attorney, Agent, or Firm—Larry J. Palguta; Ken C. Decker

[57] ABSTRACT

An anti-skid control circuit for a wheeled vehicle has a connector (15) for connection to external circuits and a warning circuit contained within the control circuit and connector (15) for enabling a visual indicator (17) upon the occurrence of a loss of power to the anti-skid control circuit, a malfunction of the anti-skid control circuit, or disconnection of the connector (15) from the anti-skid control circuit. The anti-skid braking system warning circuit includes an electrically energizable the visual indicator (17) in the form of a lamp (17), and a first transistor (33) connected in series with a source of electrical energy. A control transistor (35) is conductive to shunt the base-emitter circuit of the first transistor (33) so long as the anti-skid braking system functions properly. When the control transistor (35) becomes nonconductive indicating a lack of the anti-skid function, the base-emitter circuit of the first transistor (33) is forward biased and the lamp (17) energizes. A two-part multiconductor (25, 31) of the connector (15) electrically connects the visual warning indicator (17) and the first transistor (33). The connector (15) includes a circuit for connecting directly the lamp (17) to the source of electrical energy whenever the multiconductors (25, 31) are separated.

3 Claims, 1 Drawing Sheet

WARNING INDICATOR FOR ANTI-SKID BRAKING SYSTEM

The present invention relates generally to vehicular braking systems and more particularly to vehicle braking systems having anti-skid features. In particular, the present invention relates to warning indicators for such anti-skid braking systems.

BACKGROUND OF THE INVENTION

Automobile drivers accustomed to driving under snowy or icy conditions are familiar with the technique of "pumping" the brake pedal so as to cyclically increase and decrease the braking force exerted on the wheels such that a slipping wheel having a tendency to lock is permitted to re-accelerate back to speed corresponding to the speed of the vehicle. Such a driver induced anti-skid or antilock technique is simulated by many known anti-skid devices.

An error in, for example, the computation of the wheel speed in such anti-skid or antilock braking systems could be disastrous. An error in wheel speed determination may cause erroneous antilock cycling resulting in increased distance on what should have been a non-antilock stop. In the worst case, should the system falsely detect a wheel as being locked (zero speed), the system could release the braking pressure so that despite operator brake pedal pressure, no braking occurs. One technique for confirming wheel speed computation is disclosed in copending U.S. Ser. No. 07/763,708 entitled "Wheel Speed Verification System" and assigned to the assignee of the present application.

U.S. Pat. No. 4,546,437 addresses the question of reliability of a brake slip control apparatus by providing redundant microprocessors operating under the same software. When inconsistent results are recognized, the brake slip control circuit is disabled and an error signal occurs. A similar approach is utilized in U.S. Pat. No. 4,113,321 wherein a secondary circuit identical to the primary arithmetic circuit confirms operation of the primary circuit. An error when detected renders the anti-skid system inoperable.

It is important to the driver (and required by law) that the driver be aware that the anti-skid system has been rendered inoperable, either due to the detection of such an error or for some other reason, and this is done generally by the energization of a dash panel lamp. For example, in U.S. Pat. No. 3,911,392 a malfunction, such as an interruption of power to any one of a plurality of slip control circuits, is communicated to the driver by rendering a transistor conductive to energize a lamp. The transistor is maintained nonconductive by a set of reverse biased diodes so long as all circuits are receiving power. In somewhat similar fashion, U.S. Pat. No. 3,891,279 teaches a Darlington pair in series with a warning lamp which remain nonconductive so long as an output signal is present on a prescribed terminal of each of several failsafe circuits associated with corresponding skid control circuits.

Current requirements are that the warning indication be energized whenever the anti-skid braking system malfunctions, whenever the connector to the electronic control unit of the anti-skid braking system is disconnected, or whenever electrical power is not available to the anti-skid braking system. The above-noted prior patents fail to provide a warning under one or more of these conditions. Moreover, current techniques for accomplishing such a warning indication in all required instances requires the use of a diode or relay in the wiring harness connected to the anti-skid control circuit. It would be highly desirable that a warning indication be provided in all three cases by the anti-skid control unit and without the need for external circuit components.

Among the several objects of the present invention may be noted the provision of a circuit for communicating any disabling of the anti-skid operation to the vehicle operator; the provision of an anti-skid control unit having a relay-free failure indicator; the provision of a failure indicator for an anti-skid braking system which provides an operator visible warning indication in the event that the anti-skid electronic control unit is disconnected and is otherwise entirely contained within the control unit; and the provision of a simplistic, economical and reliable circuit for advising a vehicle operator of the inoperative status of an anti-skid braking feature. These as well as other objects and advantageous features of the present invention will be in part apparent and in part pointed out hereinafter.

SUMMARY OF THE INVENTION

In general, an anti-skid control circuit for a wheeled vehicle includes an electrically energizable visual warning indicator with a first circuit which normally couples the visual warning indicator to a source of electrical energy to energize the indicator and a second circuit for disabling the first circuit only so long as the anti-skid control circuit is operational. Whenever a connector to the anti-skid control circuit is disconnected, the visual warning indicator is also enabled. The second circuit responds to either a loss of power to the anti-skid control circuit or a malfunction of the anti-skid control circuit to allow the first circuit to enable the indicator. The present invention is an anti-skid control circuit for a wheeled vehicle, comprising an electrically energizable visual warning indicator, first circuit means normally coupling the electrically energizable visual warning indicator to a source of electrical energy and thereby energizing the indicator, second circuit means for disabling the first circuit means only so long as the anti-skid control circuit is operational, and means responsive to the disconnection of a connector to the anti-skid control circuit for enabling the visual warning indicator.

BRIEF DESCRIPTION OF THE DRAWINGS

Like reference numbers identify like components in the drawing figures.

DESCRIPTION OF THE PREFERRED EMBODIMENT

Figure 1:
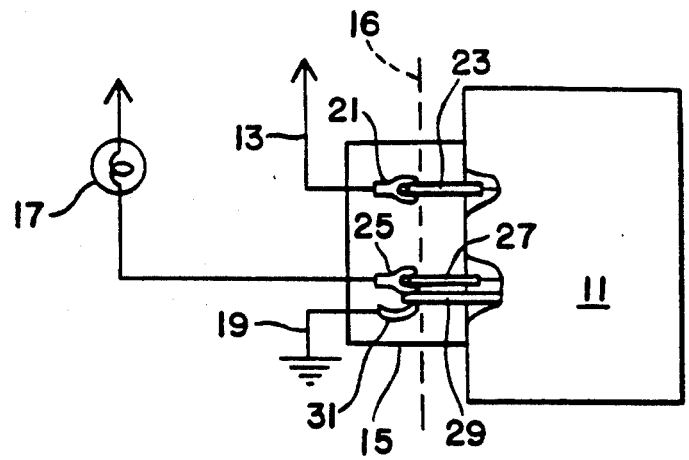
FIG. 1 is a schematic representation of an antilock brake electronic control system incorporating the present invention in one form.
Figure 2:
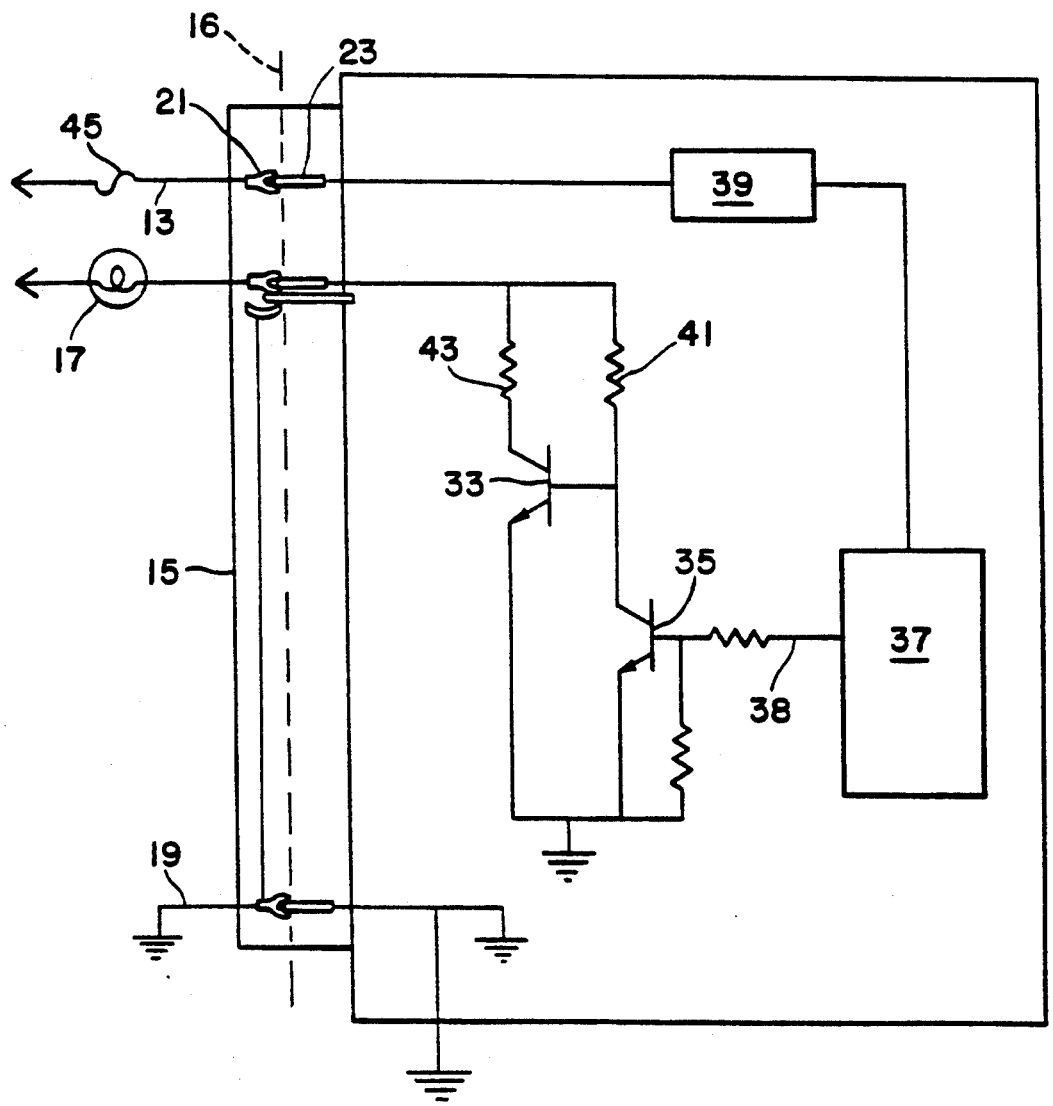
FIG. 2 is a more detailed schematic representation of the antilock brake electronic control system of FIG. 1.

In FIG. 1, an anti-skid braking system electronic control unit 11 is connected to a vehicle power source by lead 13 and to the vehicle ground by lead 19 as well as to an electrically energizable visual warning indicator such as a lamp 17. Lamp 17 is permanently directly connected to the vehicle power source. All three connections are effected by a two part connector 15 with the connector 15 including a connector circuit for selectively directly connecting the visual warning indicator to the source of electrical energy. Connector 15 is separable along dotted line 16 to disconnect the control unit 11. When the connector parts are separated, an insulative pin 29 is removed from between conductors 25 and 31. Conductor 31 is resilient and biased to move into contact with conductor 25 and activate the lamp 17. FIG. 2 shows certain of the electronic components of the electronic control unit 11 in greater detail. The microprocessor 37 receives regulated voltage from regulator 39. The external lead to the regulator is fused at 45, but the lamp 17 lead is not so fused. A pair of transistors 33 and 35 are included within control unit 11. So long as the microprocessor 37 is receiving power and performing its anti-skid function properly, transistor 35 is maintained conducting. Transistor 33 has a base-emitter circuit the conduction of which is controlled thereby. The +12 volt vehicle power source of electrical energy is connected across the series combination of the warning indicator or lamp 17 and the collector-emitter circuit of the transistor 33. Should the control transistor 35 cease to conduct either in the event of a loss of power to a control circuit for the anti-skid braking system or a malfunction of the anti-skid braking system control circuit, transistor 33 then receives base drive current by way of resistor 41, becomes conductive, and energizes the lamp 17. The collector-emitter current flow for transistor 35 is through the lamp 17 and resistor 41, however, resistor 41 is of such a high resistance that lamp 17 is not illuminated by this very small current flow.

Operation of the present invention should now be clear. If, for example, fuse 45 for some reason is blown, power is removed from the microprocessor 37 and the anti-skid feature is disabled. The output on line 38 goes low (logic level 0) turning transistor 35 off. Base-emitter drive is then available to transistor 33 by way of resistor 41 and that transistor becomes conductive energizing the lamp 17.

In summary, the invention has advantages over prior arrangements primarily in providing an indication in the event the connector to the electronic control module is disconnected and otherwise providing all the warning circuitry (except, of course, for the indicator itself) within the control module.

We claim:

1. An anti-skid control circuit for a wheeled vehicle, comprising an electrically energizable visual warning indicator, first circuit means for normally coupling the electrically energizable visual warning indicator to a source of electrical energy to energize the indicator, second circuit means for disabling the first circuit means only so long as the anti-skid control circuit is operational, the first circuit means comprising a first transistor and the second circuit means comprising a second transistor, the second transistor connected to short circuit a base-emitter circuit of the first transistor in order to shunt control current and prevent conduction by the first transistor so long as the second transistor is conducting, and means responsive to the disconnection of a connector to the anti-skid control circuit for enabling the visual warning indicator, the connector comprising a two-part multiconductor connector electrically connecting the visual warning indicator and first transistor, the connector including at least a part of the responsive means which comprises a connector circuit for connecting directly the visual warning indicator to the source of electrical energy whenever two parts of the two-part multiconductor connector are separated.

2. The control circuit of claim 1, wherein the second circuit means responds to one of a loss of power to the anti-skid control circuit and a malfunction of the anti-skid control circuit in order to allow the first circuit means to enable the warning indicator.

3. The control circuit in accordance with claim 2, wherein the connector circuit comprises an insulative pin disposed between a first conductor and a second resilient conductor, removal of the conductive pin from between the conductors permitting the second resilient conductor to engage the first conductor and effect energization of the warning indicator.

* * * * *